(12) United States Patent
Zhou et al.

(10) Patent No.: US 10,979,317 B2
(45) Date of Patent: Apr. 13, 2021

(54) SERVICE REGISTRATION METHOD AND USAGE METHOD, AND RELATED APPARATUS

(71) Applicant: HUAWEI TECHNOLOGIES CO., LTD., Shenzhen (CN)

(72) Inventors: Haifeng Zhou, Shenzhen (CN); Long Li, Shenzhen (CN); Jianqing Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 15/876,202

(22) Filed: Jan. 22, 2018

(65) Prior Publication Data
US 2018/0145890 A1 May 24, 2018

Related U.S. Application Data

(63) Continuation of application No. PCT/CN2016/080408, filed on Apr. 27, 2016.

(30) Foreign Application Priority Data

Jul. 22, 2015 (CN) .......................... 201510435586.9

(51) Int. Cl.
*H04L 12/24* (2006.01)
*H04L 12/08* (2006.01)
*H04L 29/08* (2006.01)

(52) U.S. Cl.
CPC .......... *H04L 41/5041* (2013.01); *H04L 12/08* (2013.01); *H04L 67/10* (2013.01)

(58) Field of Classification Search
CPC .................................................. H04L 41/5041
See application file for complete search history.

(56) References Cited

U.S. PATENT DOCUMENTS

| | | | |
|---|---|---|---|
| 5,790,785 A | * | 8/1998 | Klug ...................... G06F 21/41 726/11 |
| 6,363,065 B1 | * | 3/2002 | Thornton ................ H04L 12/14 370/352 |

(Continued)

FOREIGN PATENT DOCUMENTS

| | | |
|---|---|---|
| CN | 102025550 A | 4/2011 |
| CN | 103183326 A | 7/2013 |

(Continued)

OTHER PUBLICATIONS

Gilbert et al., "Brewer's Conjecture and the Feasibility of Consistent, Available, Partition-Tolerant Web Services", 2002 (Year: 2002).*

(Continued)

*Primary Examiner* — Ibdreh C Vostal
(74) *Attorney, Agent, or Firm* — Kilpatrick Townsend & Stockton LLP

(57) ABSTRACT

A service registration method and usage method, and a related apparatus are used to reduce risks generated when a service of an AP-type service providing node cannot be registered and a CP-type service providing node provides a service since distributed characteristics of a service providing node are not distinguished in a network partition scenario. The method is: obtaining, by a registration service node, network partition information, and receiving a registration request of a service providing node, where the registration request carries a distributed characteristic of the service providing node, and the distributed characteristic meets both consistency and partition tolerance, or meets both availability and partition tolerance; and determining, by the registration service node according to the network partition information and the distributed characteristic of the service providing node, whether registration of a service provided by the service providing node is allowed.

12 Claims, 9 Drawing Sheets

---

501

A registration service node obtains network partition information, and receives a registration request of a service providing node, where the registration request carries a distributed characteristic of the service providing node

502

The registration service node determines, according to the network partition information and the distributed characteristic of the service providing node, whether registration of a service provided by the service providing node is allowed

(56) References Cited

U.S. PATENT DOCUMENTS

| | | | | |
|---|---|---|---|---|
| 6,823,327 | B1* | 11/2004 | Klug | G06F 21/41 726/4 |
| 7,072,943 | B2* | 7/2006 | Landesmann | G06Q 20/10 705/39 |
| 7,313,611 | B1* | 12/2007 | Jacobs | H04L 29/06 709/223 |
| 7,370,223 | B2* | 5/2008 | Olmstead | H04L 67/10 714/3 |
| 7,702,726 | B1* | 4/2010 | Grabelsky | H04L 67/24 709/204 |
| 7,756,969 | B1* | 7/2010 | Clarke | G06F 9/465 709/223 |
| 8,572,290 | B1* | 10/2013 | Mukhopadhyay | H04L 43/50 709/251 |
| 9,237,074 | B1* | 1/2016 | Sampath | H04L 41/044 |
| 10,516,756 | B1* | 12/2019 | Matthews | H04L 67/1012 |
| 2002/0143773 | A1* | 10/2002 | Spicer | H04L 47/70 707/999.01 |
| 2003/0037126 | A1* | 2/2003 | Spicer | H04L 41/12 709/220 |
| 2003/0140131 | A1* | 7/2003 | Chandrashekhar | H04L 12/4641 709/223 |
| 2004/0030777 | A1* | 2/2004 | Reedy | G06F 9/542 709/224 |
| 2004/0059937 | A1* | 3/2004 | Nakano | G06F 21/10 726/28 |
| 2005/0239454 | A1* | 10/2005 | Kawashima | H04L 41/00 455/426.1 |
| 2006/0015416 | A1* | 1/2006 | Hoffman | G06Q 30/0605 705/28 |
| 2007/0124363 | A1* | 5/2007 | Lurie | G06F 9/5072 709/202 |
| 2007/0282988 | A1* | 12/2007 | Bornhoevd | G06Q 10/00 709/223 |
| 2008/0091835 | A1* | 4/2008 | Yuan | H04L 63/083 709/229 |
| 2009/0049049 | A1* | 2/2009 | Cheah | G06Q 30/02 |
| 2009/0055266 | A1* | 2/2009 | Brody | G06Q 30/0264 705/14.61 |
| 2009/0109839 | A1* | 4/2009 | Wang | H04L 41/042 370/218 |
| 2011/0205585 | A1* | 8/2011 | Mihara | G06F 3/1287 358/1.15 |
| 2011/0209211 | A1* | 8/2011 | Kuindersma | H04L 67/16 726/12 |
| 2011/0289052 | A1* | 11/2011 | Rambacher | G06F 16/1873 707/624 |
| 2012/0023200 | A1* | 1/2012 | Johnson | G06F 9/542 709/219 |
| 2012/0076129 | A1* | 3/2012 | Free | H04L 41/5054 370/352 |
| 2012/0331029 | A1 | 12/2012 | King, III et al. | |
| 2013/0117469 | A1* | 5/2013 | Corrigan | H04L 12/433 709/249 |
| 2013/0188515 | A1* | 7/2013 | Pinheiro | H04W 4/50 370/254 |
| 2013/0227232 | A1 | 8/2013 | Berg et al. | |
| 2014/0095813 | A1 | 4/2014 | Shukla et al. | |
| 2014/0101298 | A1* | 4/2014 | Shukla | H04L 41/5006 709/223 |
| 2014/0280595 | A1 | 9/2014 | Mani et al. | |
| 2015/0089034 | A1* | 3/2015 | Stickle | H04L 41/00 709/223 |
| 2015/0117274 | A1 | 4/2015 | Lu et al. | |
| 2015/0120473 | A1* | 4/2015 | Jung | G06Q 20/40 705/17 |
| 2015/0154624 | A1* | 6/2015 | Torabi | H04L 67/22 705/14.16 |
| 2015/0356116 | A1* | 12/2015 | Lin | G06F 16/184 707/613 |
| 2015/0370827 | A1* | 12/2015 | Parkison | G06F 16/1844 707/626 |
| 2016/0182633 | A1* | 6/2016 | Grebnov | G06F 16/1844 709/219 |
| 2016/0226809 | A1* | 8/2016 | Bell | H04L 51/066 |
| 2016/0255155 | A1* | 9/2016 | Green | H04W 4/70 709/225 |
| 2017/0187703 | A1* | 6/2017 | Enrique Salpico | G06F 21/44 |
| 2018/0001184 | A1* | 1/2018 | Tran | H04N 5/2257 |
| 2019/0199535 | A1* | 6/2019 | Falk | G06F 16/1824 |

FOREIGN PATENT DOCUMENTS

| | | |
|---|---|---|
| CN | 103297493 A | 9/2013 |
| CN | 103703464 A | 4/2014 |
| EP | 2555129 A1 | 2/2013 |

OTHER PUBLICATIONS

Kumar et al., "Evaluating Consistency on the Fly Using YCSB", 2014 (Year: 2014).*
Miret, "Consistency models in modern distributed systems. And approach to Eventual Consistency", 2014 (Year: 2014).*
Panda et al., "CAP for Networks", 2013 (Year: 2013).*
Wikipedia, "ACID", 2020 (Year: 2020).*
Wikipedia, "CAP theorem", 2020 (Year: 2020).*
XP014255922 Draft ETSI OS NFV-EVE005 V0.0.13 (Jul. 6, 2015),Network Functions Virtualisation (NFV); Ecosystem; Report on SDN Usage in NFV Architectural Framework,dated Jul. 6, 2015,total 105 pages.
XP032824221 Mazalini Antonio et al., "SDN and NFV for Network Cloud Computing: a Universal Operating System for SD Infrastructures", IEEE,dated Jun. 11, 2015,total 6 pages.

* cited by examiner

SERVICE REGISTRATION METHOD AND USAGE METHOD, AND RELATED APPARATUS

CROSS-REFERENCE TO RELATED APPLICATIONS

This application is a continuation of International Application No. PCT/CN2016/080408, filed on Apr. 27, 2016, which claims priority to Chinese Patent Application No. 201510435586.9, filed on Jul. 22, 2015. The disclosures of the aforementioned applications are hereby incorporated by reference in their entireties.

TECHNICAL FIELD

The present invention relates to the field of distributed network technologies, and in particular, to a service registration method and usage method, and a related apparatus.

BACKGROUND

In a service-oriented architecture (service-oriented architecture, SOA) and a servitization architecture, a service registry (Service Registry) is a basic function, and is an important basis of service intermediary and management. As shown in FIG. 1, a registration service function entity provides a registration service and discovery interface, and a service provider (Service Provider) registers a service with the registration service function entity by using a registration service interface provided by the registration service function entity. A service consumer (Service Consumer) queries the registration service function entity about information about a requested service provider by using a service discovery interface provided by the registration service function entity, and the service consumer is bound to the service provider and invokes a required service according to the information provided by the registration service function entity.

To avoid a single point failure, registration service function entities are generally implemented in a distributed cluster manner. To satisfy a service scale requirement, multiple instances need to be deployed for some services, and there are requirements on reliability and availability.

According to the CAP theorem, a distributed system has three characteristics, which are consistency (Consistency, C for short), availability (Availability, A for short), and partition tolerance (Partition Tolerance, P for short). Any network-based data sharing system meets a maximum of two of the three characteristics of data consistency, availability, and partition tolerance.

At present, how the registration service function entity registers and uses a service according to a distributed characteristic of the service to reduce risks in registration and service provision and improve network system performance is a problem to be resolved.

SUMMARY

Embodiments of the present invention provide a service registration method and usage method, and a related apparatus, to enable a registration service function entity to register and use a service according to distributed characteristics of the service, so as to reduce risks generated upon service registration and provision, and improve network system performance.

Specific technical solutions provided in the embodiments of the present invention are as follows.

According to a first aspect, a service registration method is provided, including:

obtaining, by a registration service node, network partition information, and receiving a registration request of a service providing node, where the registration request carries a distributed characteristic of the service providing node, and the distributed characteristic meets both consistency and partition tolerance, or meets both availability and partition tolerance; and determining, by the registration service node according to the network partition information and the distributed characteristic of the service providing node, whether registration of a service provided by the service providing node is allowed.

With reference to the first aspect, in a first possible implementation manner, the determining, by the registration service node according to the network partition information and the distributed characteristic of the service providing node, whether registration of a service provided by the service providing node is allowed includes:

when the registration service node determines, according to the network partition information, that a registration service node cluster to which the registration service node belongs has a network partition, determining that the registration of the service provided by the service providing node is prohibited if determining that the distributed characteristic of the service providing node meets both consistency and partition tolerance; and determining that the registration of the service provided by the service providing node is allowed if determining that the distributed characteristic of the service providing node meets both availability and partition tolerance.

With reference to the first aspect, in a second possible implementation manner, the determining, by the registration service node according to the network partition information and the distributed characteristic of the service providing node, whether registration of a service provided by the service providing node is allowed includes:

according to the network partition information and the distributed characteristic of the service providing node, determining, by the registration service node, that the registration of the service provided by the service providing node is prohibited if determining that the distributed characteristic of the service providing node meets both consistency and partition tolerance and a service providing node cluster to which the service providing node belongs has a network partition; and determining that the registration of the service provided by the service providing node is allowed if determining that the distributed characteristic of the service providing node meets both availability and partition tolerance.

With reference to the second possible implementation manner of the first aspect, in a third possible implementation manner, the obtaining, by a registration service node, network partition information includes:

receiving, by the registration service node, the network partition information reported by the service providing node, where the network partition information is reported by the service providing node when the service providing node determines that communication between service providing nodes in the service providing node cluster to which the service providing node belongs is interrupted.

According to a second aspect, a service usage method is provided, including:

obtaining, by a registration service node, network partition information, and receiving a query request of a service using node, where the query request carries an identifier of a requested service;

determining, by the registration service node, a service providing node that provides a service indicated by the identifier of the service and a distributed characteristic of the service providing node, where the distributed characteristic meets both consistency and partition tolerance, or meets both availability and partition tolerance; and determining, by the registration service node according to the network partition information and the distributed characteristic of the service providing node, whether use of the service provided by the service providing node is allowed.

With reference to the second aspect, in a first possible implementation manner, the determining, by the registration service node according to the network partition information and the distributed characteristic of the service providing node, whether use of the service provided by the service providing node is allowed includes:

when the registration service node determines, according to the network partition information, that a registration service node cluster to which the registration service node belongs has a network partition, determining that the use of the service provided by the service providing node is prohibited if determining that the distributed characteristic of the service providing node meets both consistency and partition tolerance; and determining that the use of the service provided by the service providing node is allowed if determining that the distributed characteristic of the service providing node meets both availability and partition tolerance.

With reference to the second aspect, in a second possible implementation manner, the determining, by the registration service node according to the network partition information and the distributed characteristic of the service providing node, whether use of the service provided by the service providing node is allowed includes:

according to the network partition information and the distributed characteristic of the service providing node, determining, by the registration service node, that the use of the service provided by the service providing node is prohibited if determining that the distributed characteristic of the service providing node meets both consistency and partition tolerance and a service providing node cluster to which the service providing node belongs has a network partition; and determining that the use of the service provided by the service providing node is allowed if determining that the distributed characteristic of the service providing node meets both availability and partition tolerance.

With reference to the second possible implementation manner of the second aspect, in a third possible implementation manner, the obtaining, by a registration service node, network partition information includes:

receiving, by the registration service node, the network partition information reported by the service providing node, where the network partition information is reported by the service providing node when the service providing node determines that communication between service providing nodes in the service providing node cluster to which the service providing node belongs is interrupted.

According to a third aspect, a registration service node device is provided, including:

an obtaining module, configured to obtain network partition information, and receive a registration request of a service providing node, where the registration request carries a distributed characteristic of the service providing node, and the distributed characteristic meets both consistency and partition tolerance, or meets both availability and partition tolerance; and a processing module, configured to determine, according to the network partition information and the distributed characteristic of the service providing node, whether registration of a service provided by the service providing node is allowed.

With reference to the third aspect, in a first possible implementation manner, the processing module is specifically configured to:

when determining, according to the network partition information, that a registration service node cluster to which the registration service node belongs has a network partition, determine that the registration of the service provided by the service providing node is prohibited if determining that the distributed characteristic of the service providing node meets both consistency and partition tolerance; and determine that the registration of the service provided by the service providing node is allowed if determining that the distributed characteristic of the service providing node meets both availability and partition tolerance.

With reference to the third aspect, in a second possible implementation manner, the processing module is specifically configured to:

according to the network partition information and the distributed characteristic of the service providing node, determine that the registration of the service provided by the service providing node is prohibited if determining that the distributed characteristic of the service providing node meets both consistency and partition tolerance and a service providing node cluster to which the service providing node belongs has a network partition; and determine that the registration of the service provided by the service providing node is allowed if determining that the distributed characteristic of the service providing node meets both availability and partition tolerance.

With reference to the second possible implementation manner of the third aspect, in a third possible implementation manner, the obtaining module is specifically configured to:

receive the network partition information reported by the service providing node, where the network partition information is reported by the service providing node when the service providing node determines that communication between service providing nodes in the service providing node cluster to which the service providing node belongs is interrupted.

According to a fourth aspect, a registration service node device is provided, including:

an obtaining module, configured to obtain network partition information, and receive a query request of a service using node, where the query request carries an identifier of a requested service;

a determining module, configured to determine a service providing node that provides a service indicated by the identifier of the service and a distributed characteristic of the service providing node, where the distributed characteristic meets both consistency and partition tolerance, or meets both availability and partition tolerance; and a decision module, configured to determine, according to the network partition information and the distributed characteristic of the service providing node, whether use of the service provided by the service providing node is allowed.

With reference to the fourth aspect, in a first possible implementation manner, the decision module is specifically configured to:

when determining, according to the network partition information, that a registration service node cluster to which the registration service node belongs has a network partition, determine that the use of the service provided by the service providing node is prohibited if determining that the distributed characteristic of the service providing node meets both consistency and partition tolerance; and determine that the use of the service provided by the service providing node is allowed if determining that the distributed characteristic of the service providing node meets both availability and partition tolerance.

With reference to the fourth aspect, in a second possible implementation manner, the decision module is specifically configured to:

according to the network partition information and the distributed characteristic of the service providing node, determine that the use of the service provided by the service providing node is prohibited if determining that the distributed characteristic of the service providing node meets both consistency and partition tolerance and a service providing node cluster to which the service providing node belongs has a network partition; and determine that the use of the service provided by the service providing node is allowed if determining that the distributed characteristic of the service providing node meets both availability and partition tolerance.

With reference to the second possible implementation manner of the fourth aspect, in a third possible implementation manner, the obtaining module is specifically configured to:

receive the network partition information reported by the service providing node, where the network partition information is reported by the service providing node when the service providing node determines that communication between service providing nodes in the service providing node cluster to which the service providing node belongs is interrupted.

Based on the foregoing technical solutions, in the embodiments of the present invention, when registering a service provided by a service providing node, a registration service node obtains a distributed characteristic of the service providing node and network partition information, and determines, according to the network partition information and the distributed characteristic of the service providing node, whether registration of the service provided by the service providing node is allowed, or whether use of the service provided by the service providing node is allowed, so that the registration service node can distinguish an AP-type service providing node from a CP-type service providing node, and can separately process service providing nodes with different distributed characteristics when there is a network partition. This resolves a problem that because distributed characteristics of service providing nodes are not differentiated in a network partition scenario, a service of the AP-type service providing node cannot be registered and a risk is generated when the CP-type service providing node provides a service, thereby reducing risks generated when the registration service node registers and provides a service, and improving network system performance.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the CAP theorem, consistency of a distributed system refers to that all nodes have same data at the same time; availability refers to that a response to each request is ensured regardless of success or failure; and partition tolerance refers to that separated systems function properly when there is a network partition. Because of a hardware limit, problems such as delay, and packet loss definitely occur in a current network, and the partition tolerance must be ensured. Therefore, services in a high availability cluster (High Available, HA) architecture are CP-type services emphasizing consistency, or AP-type services emphasizing availability. The CP-type services are defined as services that meet C and P characteristics but may not meet the A characteristic, and the AP-type services are defined as services that meet A and P characteristics but may not meet the C characteristic.

Solution 1:

Registration services (for example, zookeeper, etcd, or doozer) having C and P characteristics are referred to as CP-type registration services for short and emphasize data consistency. After a service provider requests to register with a registration service node in a registration service cluster, it is ensured that registered service data on each registration service node in the registration service cluster is consistent. The CP-type registration services usually use the paxos, zab or raft protocol to achieve strong consistency of data. The principle of the protocol may be summarized as: when determining that data in any registration service node in the cluster is changed, a registration service node serving as a leader (Leader) role in the registration service cluster instructs another registration service node in the cluster to perform corresponding data update, to ensure consistency of service data stored on all registration service nodes in the cluster.

For the cluster, a network partition is unavoidable, and there are the following two partition scenarios when a network partition is performed for the CP-type registration service cluster.

Figure 1:
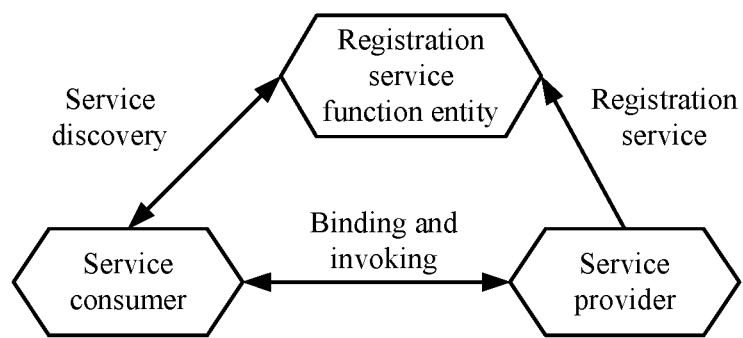
FIG. 1 is a schematic diagram of a service-oriented architecture and a servitization architecture.
Figure 2:
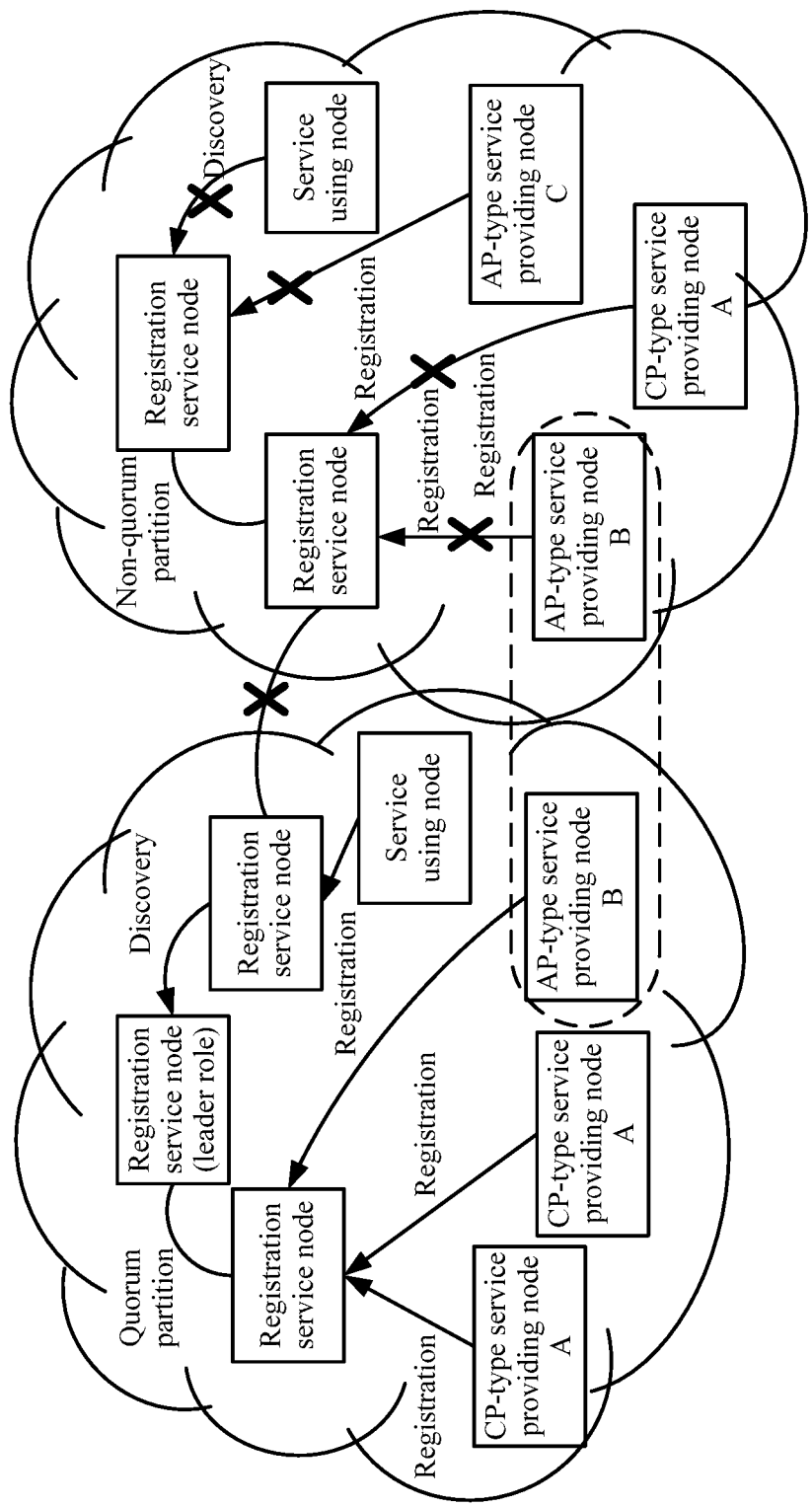
FIG. 2 is a schematic diagram of a CP-type registration service partition scenario 1.

Partition scenario 1: As shown in FIG. 2, if the registration service node serving as a leader role is located in a quorum partition (quorum side), a service providing node in the quorum partition may register a service with a registration service node in the quorum partition, and a service using node in the quorum partition may query a service in the registration service node in the quorum partition. Because there is no registration service node serving as a leader role in a non-quorum partition (non-quorum side), consistency between registration service nodes in the non-quorum partition cannot be ensured. Therefore, a service providing node in the non-quorum partition cannot register a service, and the service using node cannot query a service. The quorum partition is a partition with a largest quantity of included registration service nodes, and other partitions other than the quorum partition are the non-quorum partition.

Figure 3:
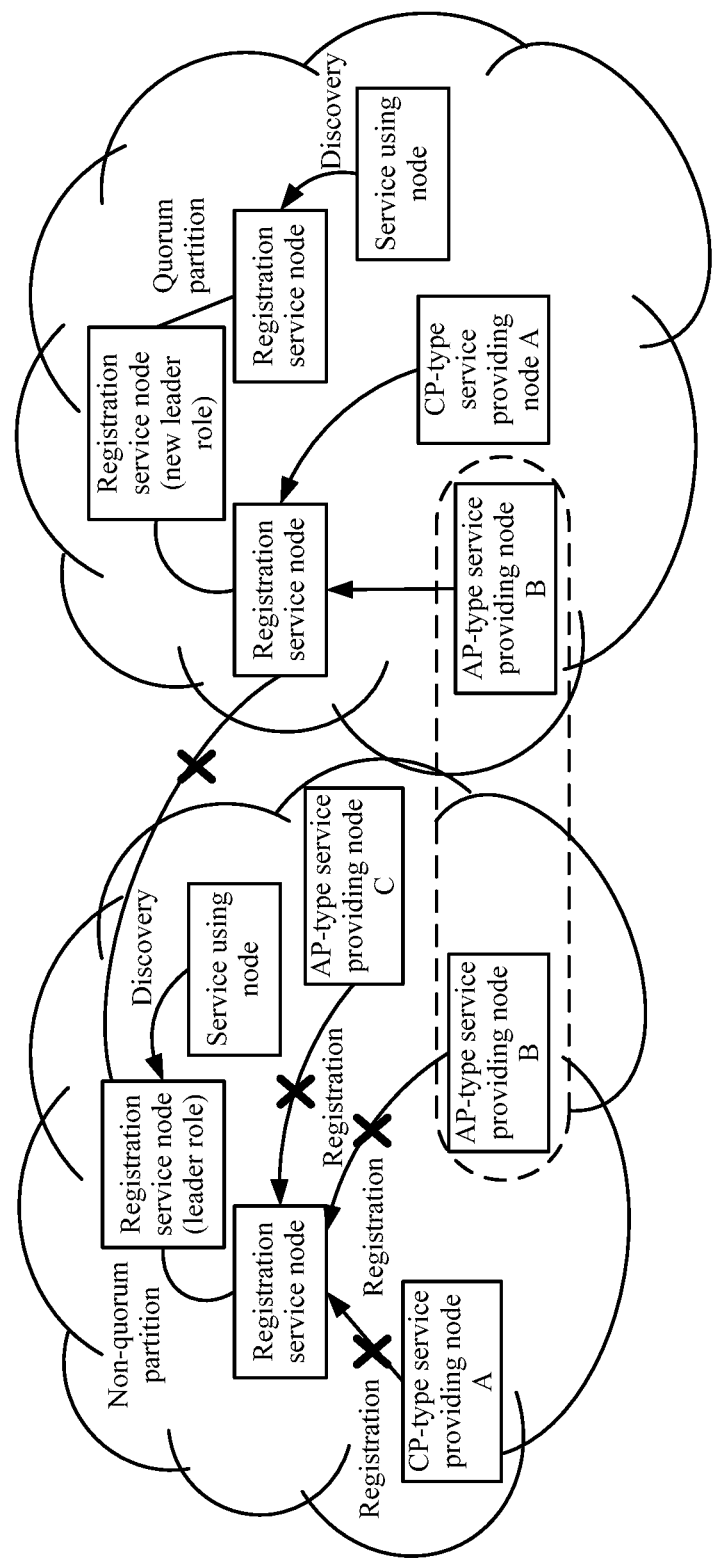
FIG. 3 is a schematic diagram of a CP-type service registration partition scenario 2.

Partition scenario 2: As shown in FIG. 3, if the registration service node serving as a leader role is located in the non-quorum partition, the registration service node loses a quorum function, so that a service providing node cannot register a service with a registration service node in the non-quorum partition, but the service using node can still query a service in the registration service node in the non-quorum partition. One of registration service nodes in the quorum partition is selected to serve as a new leader role, so as to ensure consistency between the registration service nodes in the quorum partition. Therefore, a service providing node in the quorum partition may register a service, and the service using node may query a service.

in the network partition scenario 1 or scenario 2, in the scenario that the CP-type registration service cluster is partitioned, because a registration service node in the non-quorum partition cannot ensure the CP characteristic, a CP-type service providing node cannot register, but an AP-type service providing node may preferably consider availability and give up consistency. In this scenario, the CP-type service providing node and the AP-type service providing node are not differentiated. As a result, the AP-type service providing node cannot register a service or provide a service to the external, for example, an AP-type service providing node B in the non-quorum partition in FIG. 2 and FIG. 3.

Solution 2:

The AP-type registration services (for example, eureaka, or serf) emphasize availability and give up consistency, and do not use a consistency protocol, and there is no complex procedure in which a leader role needs to vote to determine whether to update data. In the network partition scenario, the AP-type registration service node may receive and process a registration request of a service providing node, and process a query request of the service using node.

Figure 4:
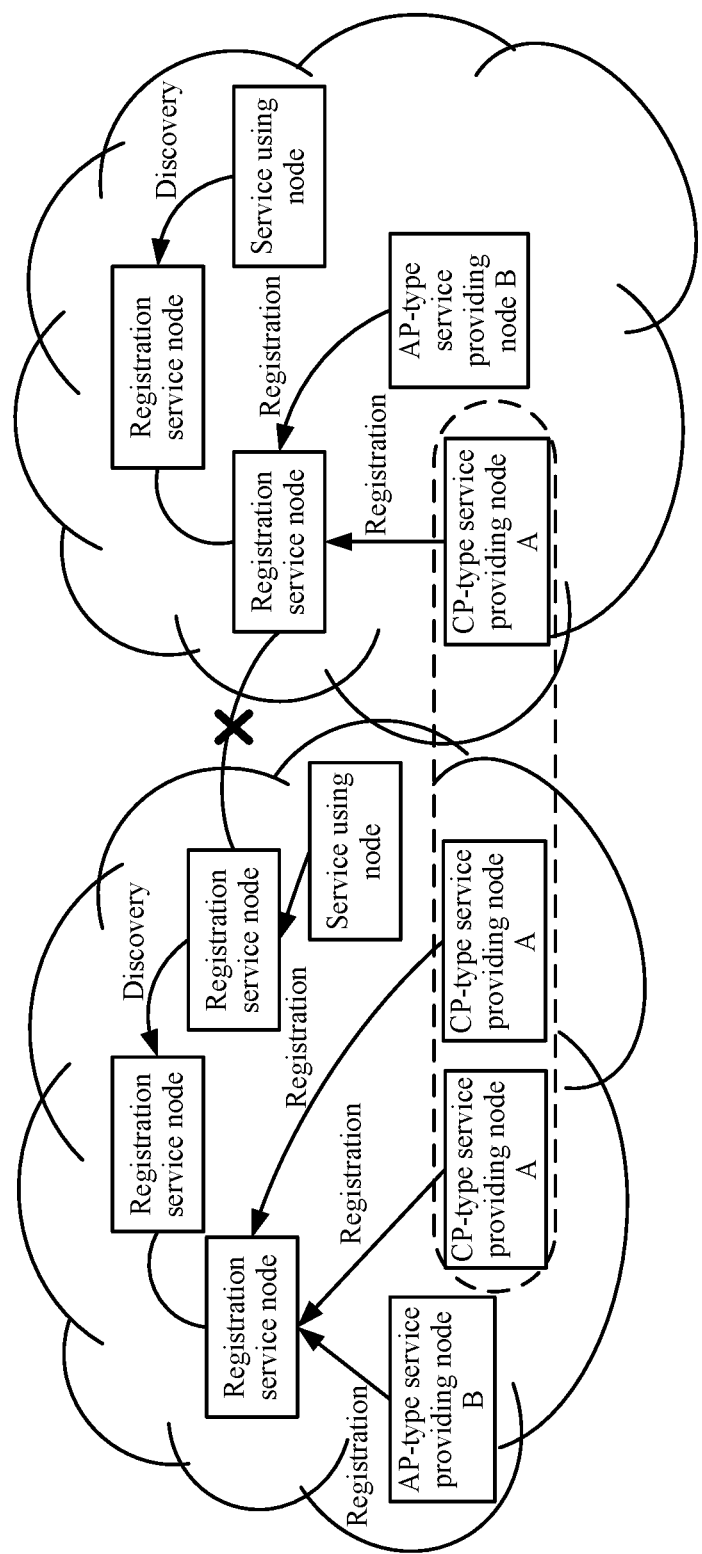
FIG. 4 is a schematic diagram of an AP-type service registration partition scenario.

The inventor finds that, in the network partition scenario, if a CP-type service providing node cluster is assigned to different partitions, an AP-type registration service node may still support a CP-type service providing node in each partition in registering a service with a registration service node in a respective group. This leads to inconsistency of data stored in each partition, causing a risk when the CP-type service providing node provides a service to the external. For a CP-type service providing node A shown in FIG. 4, the CP-type service providing node A is assigned to different partitions, and because the AP-type registration service node in each partition emphasizes availability, the CP-type service providing node A can register with the registration service node in a partition at which the CP-type service providing node A is located and provide a service, so that CP-type service providing nodes in different partitions may provide inconsistent service data and generate a risk.

Figure 5:
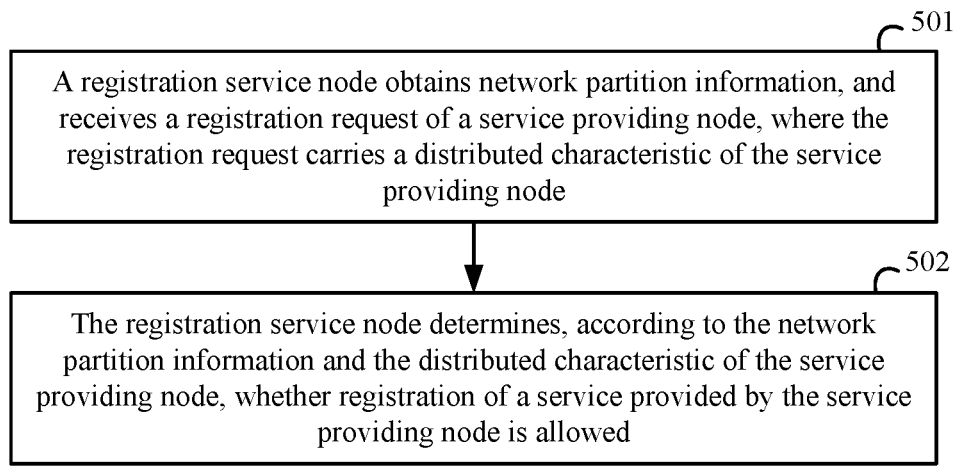
FIG. 5 is a schematic flowchart of a service registration method executed by a registration service node according to an embodiment of the present invention.

Based on the foregoing analysis, in the embodiments of the present invention, as shown in FIG. 5, a detailed method process of service registration by a registration service node is as follows.

Step 501: The registration service node obtains network partition information, and receives a registration request of a service providing node, where the registration request carries a distributed characteristic of the service providing node.

The distributed characteristic is a CP characteristic that meets both consistency C and partition tolerance P, or is an AP characteristic that meets both availability A and partition tolerance P.

In the embodiment of the present invention, a type parameter is added for a registration interface of the registration service node, and a value of the type parameter is AP or CP. The registration request sent by the service providing node to the registration service node carries the distributed characteristic, that is, AP or CP, of the service providing node, and the distribute characteristic is determined according to a design objective set by a designer. The registration service node receives the registration request of the service providing node by using the registration interface, and determines the value of the type parameter according to the distributed characteristic carried in the registration request.

Figure 6:
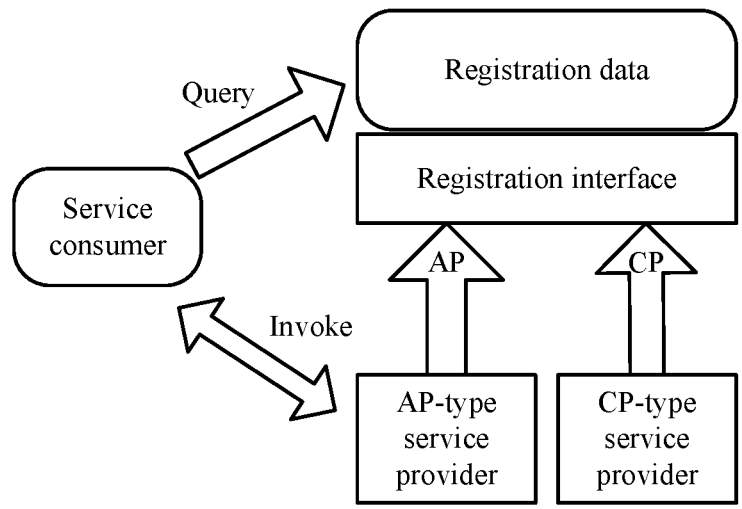
FIG. 6 is a schematic diagram of service registration and usage according to an embodiment of the present invention.

As shown in FIG. 6, an AP-type service providing node adds the distributed characteristic AP to a registration request, a CP-type service providing node adds the distributed characteristic CP to a registration request, and the distributed characteristics of the service providing nodes are transmitted to a registration service node by using the type parameter of the registration interface.

Step 502: The registration service node determines, according to the network partition information and the distributed characteristic of the service providing node, whether registration of a service provided by the service providing node is allowed.

In specific implementation, according to different network partition information, the registration service node uses the following two manners to determine whether registration of a service provided by the service providing node is allowed. Details are as follows.

First manner: When determining, according to the network partition information, that a registration service node cluster to which the registration service node belongs has a network partition, the registration service node determines that the registration of the service provided by the service providing node is prohibited if determining that the distributed characteristic of the service providing node is the CP characteristic; and determines that the registration of the service provided by the service providing node is allowed if determining that the distributed characteristic of the service providing node is the AP characteristic.

In the first manner, each registration service node in the registration service node cluster monitors whether communication between the registration service node and another connected registration service node is interrupted. If communication between registration service nodes in the registration service node cluster is interrupted, it is determined that the registration service node cluster has a network partition, and each registration service node in the registration service node cluster separately obtains network partition information. The network partition information is used to indicate that the registration service node cluster has a network partition. Specifically, the registration service node generates the network partition information when detecting that communication between the registration service node and another registration service node in the registration service node cluster to which the registration service node belongs is interrupted; or the registration service node receives the network partition information sent by another registration service node in the registration service node cluster to which the registration service node belongs, and the network partition information is generated when the another registration service node detects that communication between the another registration service node and the connected registration service node is interrupted.

Figure 7:
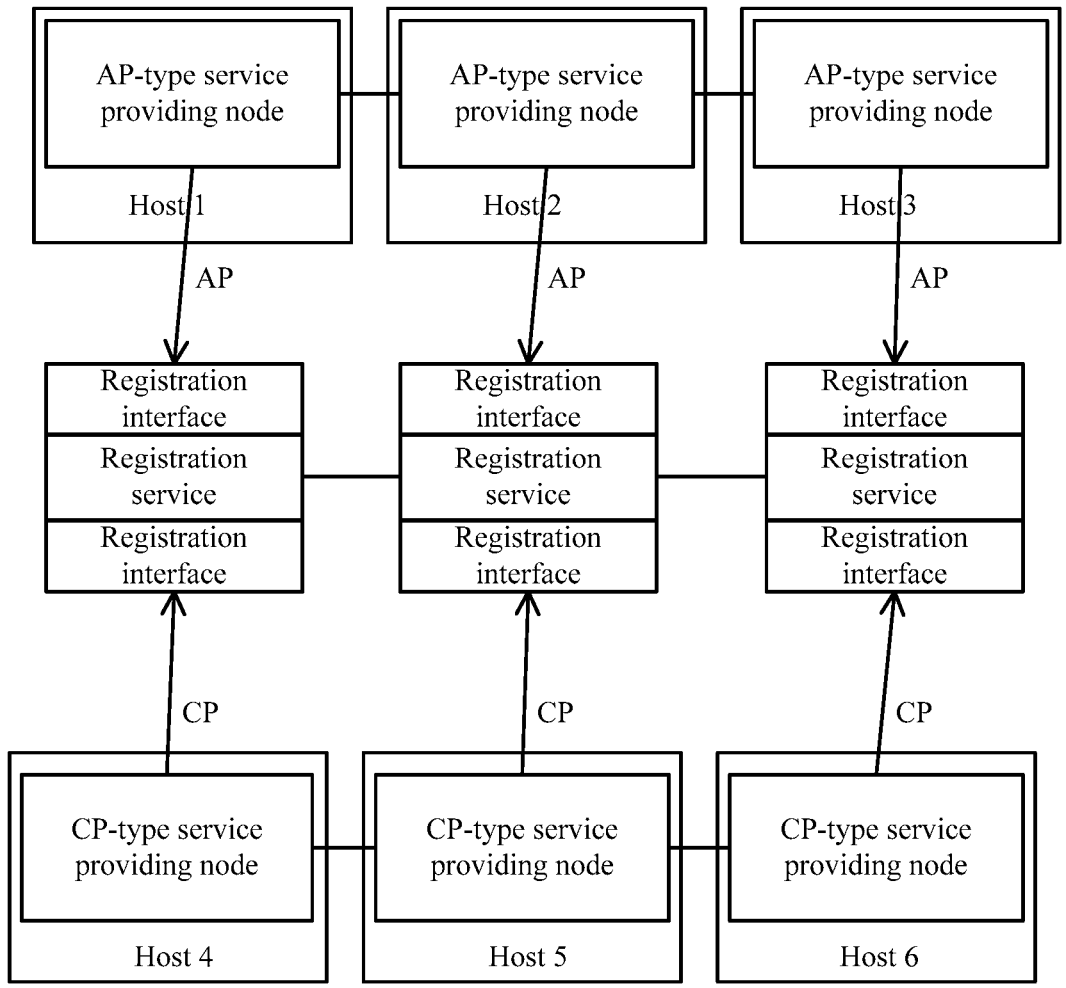
FIG. 7 is a schematic diagram of a service system architecture according to an embodiment of the present invention.

In specific implementation, as shown in FIG. 7, each registration service node in the registration service node cluster is provided with a registration interface, and a host 1, a host 2, and a host 3 form an AP-type service providing node cluster, and a host 4, a host 5, and a host 6 form a CP-type service providing node cluster. An AP-type service providing node adds an AP parameter to a to-be-sent registration request, and the parameter is transmitted to a registration service node by using a type parameter of a registration interface. A CP-type service providing node adds a CP parameter to a to-be-sent registration request, and the parameter is transmitted to a registration service node by using a type parameter of a registration interface. A registration service node 1, a registration service node 2, and a registration service node 3 are sequentially connected. Each registration service node monitors whether communication between the registration service node and a connected registration service node is interrupted. If one registration service node detects that communication between the one registration service node and a connected registration service node is interrupted, it is determined that the registration service node cluster has a network partition. A registration service node in each partition allows registration of a service provided by the AP-type service providing node, prohibits registration of a service provided by the CP-type service providing node, and prohibits use of the service provided by the CP-type service providing node.

Second manner: According to the network partition information and the distributed characteristic of the service providing node, the registration service node determines that the registration of the service provided by the service providing node is prohibited if determining that the distributed characteristic of the service providing node is the CP characteristic and a service providing node cluster to which the service providing node belongs has a network partition; and determines that the registration of the service provided by the service providing node is allowed if determining that the distributed characteristic of the service providing node is the AP characteristic.

In the second manner, the registration service node receives the network partition information reported by the service providing node. The network partition information is reported by the service providing node when the service providing node determines that communication between service providing nodes in the service providing node cluster to which the service providing node belongs is interrupted.

Figure 8:
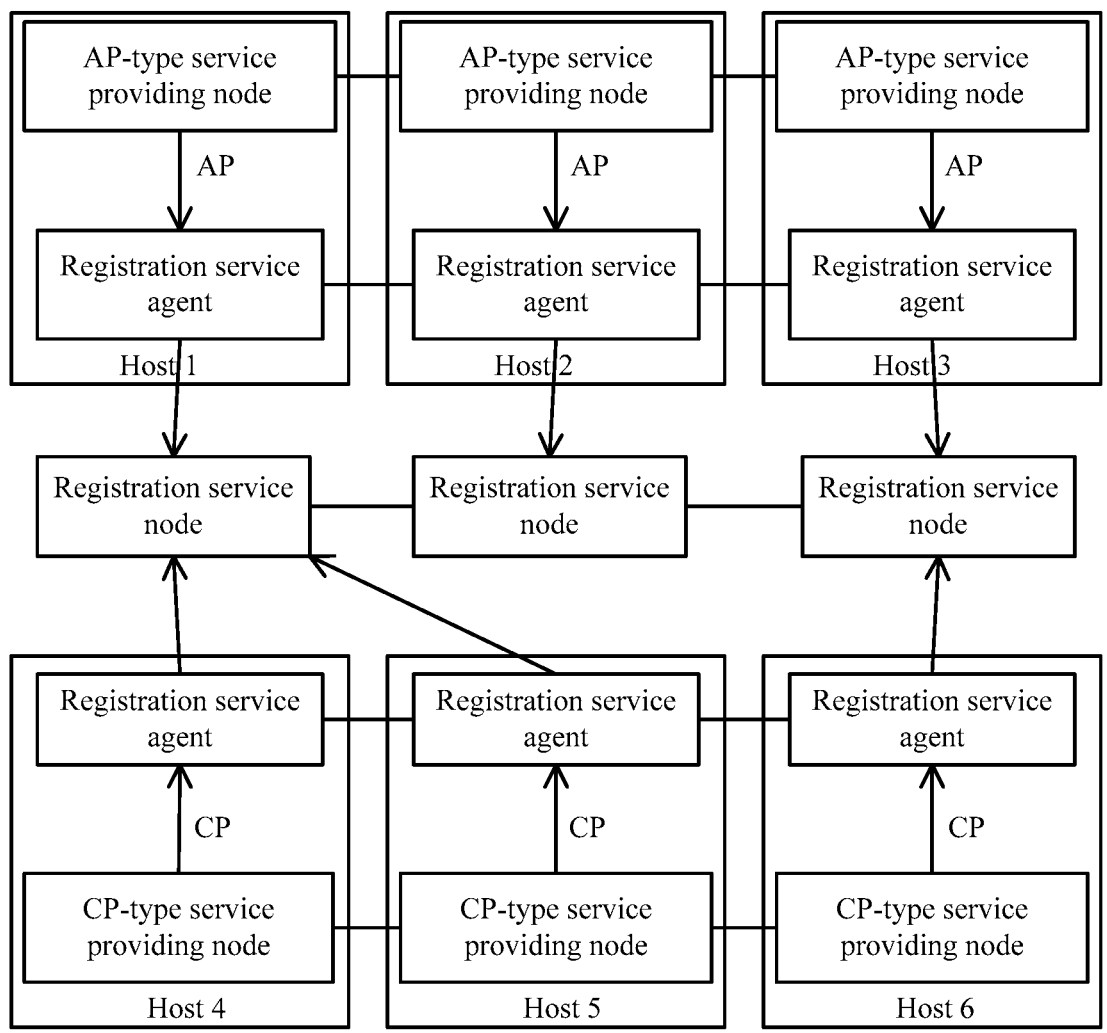
FIG. 8 is a schematic diagram of another service system architecture according to an embodiment of the present invention.

In specific implementation, as shown in FIG. 8, each service providing node is provided with a registration service agent function, and service providing nodes belonging to a same cluster are sequentially connected. For example, a host 1, a host 2, and a host 3 form an AP-type service providing node cluster, and a host 4, a host 5, and a host 6 form a CP-type service providing node cluster, and registration service agents on the host 4, the host 5, and the host 6 are sequentially connected. A service providing node monitors, by using the registration service agent function, whether communication between the service providing node and another connected service providing node is interrupted, and if one service providing node detects that communication between the one service providing node and a connected service providing node is interrupted, it is determined that the cluster at which the service providing node is located has a network partition. The service providing node reports an identifier of a service providing node having a network partition and a distributed characteristic to the registration service node by using the registration service agent function. When determining that the distributed characteristic of the service providing node having a network partition is the CP characteristic, the registration service node rejects registration of the service provided by the service providing node, and prohibits use of the service provided by the service providing node.

Figure 9:
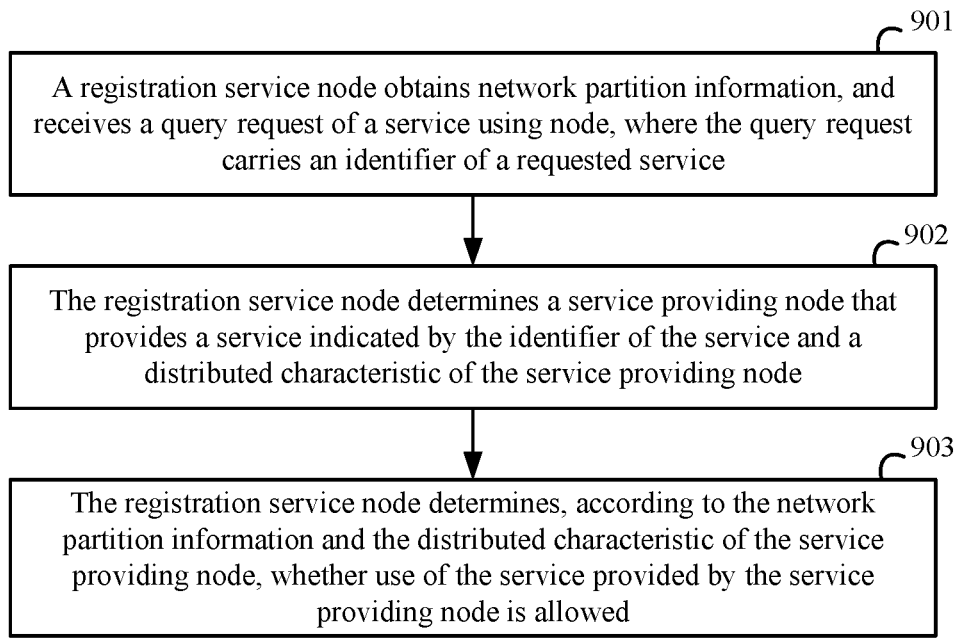
FIG. 9 is a schematic flowchart of a service provision method executed by a registration service node according to an embodiment of the present invention.

Based on a same principle, in this embodiment of the present invention, as shown in FIG. 9, a detailed method process in which a registration service node provides a requested service for a service using node is as follows.

Step 901: The registration service node obtains network partition information, and receives a query request of the service using node, where the query request carries an identifier of the requested service.

A corresponding relationship between the identifier of the service, a service provider providing the service, and a distributed characteristic is saved on the registration service node.

Step 902: The registration service node determines a service providing node that provides a service indicated by the identifier of the service and a distributed characteristic of the service providing node.

The distributed characteristic is a CP characteristic that meets both consistency C and partition tolerance P, or is an AP characteristic that meets both availability A and partition tolerance P.

Step 903: The registration service node determines, according to the network partition information and the distributed characteristic of the service providing node, whether use of the service provided by the service providing node is allowed.

In specific implementation, according to different network partition information, the registration service node uses the following two manners to determine whether use of the service provided by the service providing node is allowed. Details are as follows:

First manner: When determining, according to the network partition information, that a registration service node cluster to which the registration service node belongs has a network partition, the registration service node determines that the use of the service provided by the service providing node is prohibited if determining that the distributed characteristic of the service providing node is the CP characteristic; and determines that the use of the service provided by the service providing node is allowed if determining that the distributed characteristic of the service providing node is the AP characteristic.

In the first manner, each registration service node in the registration service node cluster monitors whether communication between the registration service node and another connected registration service node is interrupted, if communication between registration service nodes in the registration service node cluster is interrupted, it is determined that the registration service node cluster has a network partition, and each registration service node in the registration service node cluster separately obtains network partition information. The network partition information is used to indicate that the registration service node cluster has a network partition. Specifically, the registration service node generates the network partition information when detecting that communication between the registration service node and another registration service node in the registration service node cluster to which the registration service node belongs is interrupted; or the registration service node receives the network partition information sent by another registration service node in the registration service node cluster to which the registration service node belongs, and the network partition information is generated when the another registration service node detects that communication between the another registration service node and the connected registration service node is interrupted.

Second manner: According to the network partition information and the distributed characteristic of the service providing node, the registration service node determines that the use of the service provided by the service providing node is prohibited if determining that the distributed characteristic of the service providing node is the CP characteristic and a service providing node cluster to which the service providing node belongs has a network partition; and determines that the use of the service provided by the service providing node is allowed if determining that the distributed characteristic of the service providing node is the AP characteristic.

In the second manner, the registration service node receives the network partition information reported by the service providing node, and the network partition information is reported by the service providing node when the service providing node determines that communication between service providing nodes in the service providing node cluster to which the service providing node belongs is interrupted.

Figure 10:
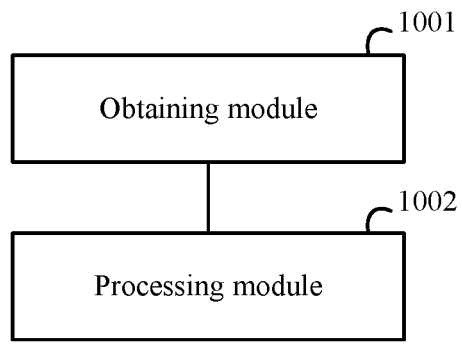
FIG. 10 is a schematic structural diagram of a registration service node device according to an embodiment of the present invention.

Based on a same inventive concept, an embodiment of the present invention provides a registration service node device. For specific implementation of the registration service node device, reference may be made to descriptions of a registration service node in the foregoing method embodiments, same details are not repeatedly described herein. As shown in FIG. 10, the registration service node device mainly includes:

an obtaining module 1001, configured to obtain network partition information, and receive a registration request of a service providing node, where the registration request carries a distributed characteristic of the service providing node, and the distributed characteristic meets both consistency and partition tolerance, or meets both availability and partition tolerance; and a processing module 1002, configured to determine, according to the network partition information and the distributed characteristic of the service providing node, whether registration of a service provided by the service providing node is allowed.

In specific implementation, the processing module 1002 is specifically configured to:

when determining, according to the network partition information, that a registration service node cluster to which the registration service node belongs has a network partition, determine that the registration of the service provided by the service providing node is prohibited if determining that the distributed characteristic of the service providing node is the CP characteristic; and determine that the registration of the service provided by the service providing node is allowed if determining that the distributed characteristic of the service providing node is the AP characteristic.

The network partition information is generated when the obtaining module detects that communication between the registration service node and another registration service node in the registration service node cluster to which the obtaining module belongs is interrupted; or the obtaining module receives the network partition information sent by another registration service node in the registration service node cluster to which the obtaining module belongs, and the network partition information is generated when the another registration service node detects that communication between the another registration service node and a connected registration service node is interrupted.

In another specific implementation, the processing module 1002 is specifically configured to:

according to the network partition information and the distributed characteristic of the service providing node, determine that the registration of the service provided by the service providing node is prohibited if determining that the distributed characteristic of the service providing node is the CP characteristic and a service providing node cluster to which the service providing node belongs has a network partition; and determine that the registration of the service provided by the service providing node is allowed if determining that the distributed characteristic of the service providing node is the AP characteristic.

The obtaining module 1001 is specifically configured to:

receive the network partition information reported by the service providing node, where the network partition information is reported by the service providing node when the service providing node determines that communication between service providing nodes in the service providing node cluster to which the service providing node belongs is interrupted.

Figure 11:
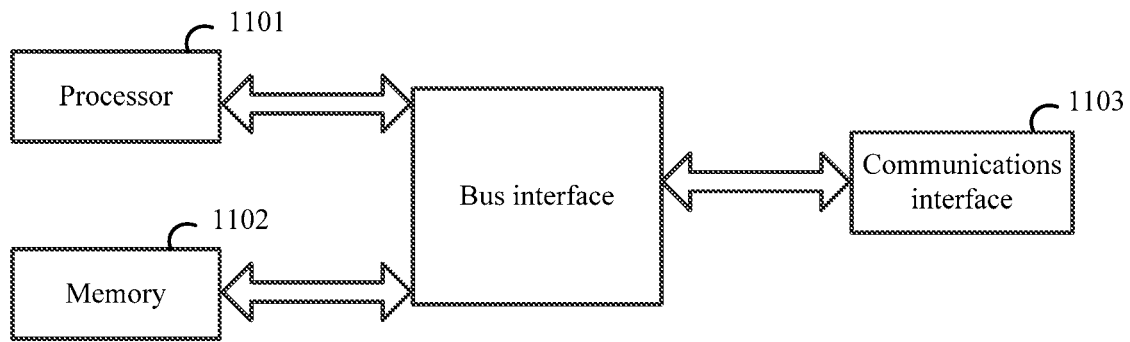
FIG. 11 is a schematic structural diagram of another registration service node device according to an embodiment of the present invention.

Based on a same inventive concept, an embodiment of the present invention provides a registration service node device. For specific implementation of the registration service node device, reference may be made to descriptions of a registration service node in the foregoing method embodiments, same details are not repeatedly described herein. As shown in FIG. 11, the registration service node device mainly includes a processor 1101, a memory 1102, and a communications interface 1103. The memory 1102 stores a preset program, the processor 1101 reads the program stored in the memory 1102, and executes the following procedure according to the program:

obtaining, by using the communications interface 1103, network partition information, and receiving a registration request of a service providing node by using the communications interface 1103, where the registration request carries a distributed characteristic of the service providing node, and the distributed characteristic is a CP characteristic that meets both consistency C and partition tolerance P, or is an AP characteristic that meets both availability A and partition tolerance P; and determining, according to the network partition information and the distributed characteristic of the service providing node, whether registration of a service provided by the service providing node is allowed.

In specific implementation, when determining, according to the network partition information, that a registration service node cluster to which the registration service node belongs has a network partition, the processor 1101 determines that the registration of the service provided by the service providing node is prohibited if determining that the distributed characteristic of the service providing node is the CP characteristic; and determines that the registration of the service provided by the service providing node is allowed if determining that the distributed characteristic of the service providing node is the AP characteristic.

The network partition information is generated when the processor detects that communication between the processor and another registration service node in the registration service node cluster to which the processor belongs is interrupted; or the processor receives, by using the communications interface, the network partition information sent by another registration service node in the registration service node cluster to which the processor belongs, and the network partition information is generated when the another registration service node detects that communication between the another registration service node and a connected registration service node is interrupted.

In another specific implementation, according to the network partition information and the distributed characteristic of the service providing node, the processor 1101 determines that the registration of the service provided by the service providing node is prohibited if determining that the distributed characteristic of the service providing node is the CP characteristic and a service providing node cluster to which the service providing node belongs has a network partition; and determines that the registration of the service provided by the service providing node is allowed if determining that the distributed characteristic of the service providing node is the AP characteristic.

The processor 1101 receives, by using the communications interface 1103, the network partition information reported by the service providing node, where the network partition information is reported by the service providing node when the service providing node determines that communication between service providing nodes in the service providing node cluster to which the service providing node belongs is interrupted.

Figure 12:
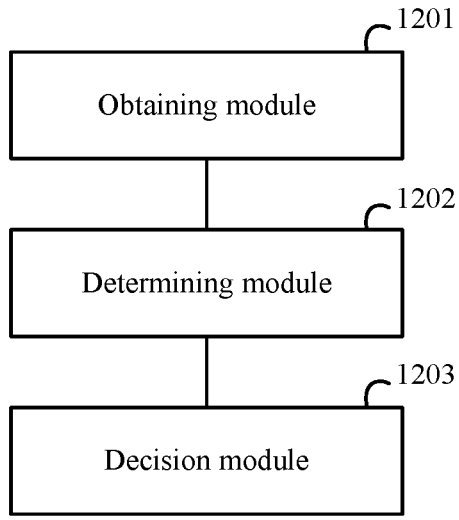
FIG. 12 is a schematic structural diagram of another registration service node device according to an embodiment of the present invention.

Based on a same inventive concept, an embodiment of the present invention provides a registration service node device. For specific implementation of the registration service node device, reference may be made to descriptions of a registration service node in the foregoing method embodiments, same details are not repeatedly described herein. As shown in FIG. 12, the registration service node device mainly includes:

an obtaining module 1201, configured to obtain network partition information, and receive a query request of a service using node, where the query request carries an identifier of a requested service;

a determining module 1202, configured to determine a service providing node that provides a service indicated by the identifier of the service and a distributed characteristic of the service providing node, where the distributed characteristic is a CP characteristic that meets both consistency C and partition tolerance P, or is an AP characteristic that meets both availability A and partition tolerance P; and a decision module 1203, configured to determine, according to the network partition information and the distributed characteristic of the service providing node, whether use of the service provided by the service providing node is allowed.

In specific implementation, the decision module 1203 is specifically configured to:

when determining, according to the network partition information, that a registration service node cluster to which the registration service node belongs has a network partition, determine that the use of the service provided by the service providing node is prohibited if determining that the distributed characteristic of the service providing node is the CP characteristic; and determine that the use of the service provided by the service providing node is allowed if determining that the distributed characteristic of the service providing node is the AP characteristic.

The network partition information is generated when the obtaining module detects that communication between the registration service node and another registration service node in the registration service node cluster to which the obtaining module belongs is interrupted; or the obtaining module receives the network partition information sent by another registration service node in the registration service node cluster to which the obtaining module belongs, and the network partition information is generated when the another registration service node detects that communication between the another registration service node and a connected registration service node is interrupted.

In another specific implementation, the decision module 1203 is specifically configured to:

according to the network partition information and the distributed characteristic of the service providing node, determine that the use of the service provided by the service providing node is prohibited if determining that the distributed characteristic of the service providing node is the CP characteristic and a service providing node cluster to which the service providing node belongs has a network partition; and determine that the use of the service provided by the service providing node is allowed if determining that the distributed characteristic of the service providing node is the AP characteristic.

The obtaining module 1201 is specifically configured to:

receive the network partition information reported by the service providing node, where the network partition information is reported by the service providing node when the service providing node determines that communication between service providing nodes in the service providing node cluster to which the service providing node belongs is interrupted.

Figure 13:
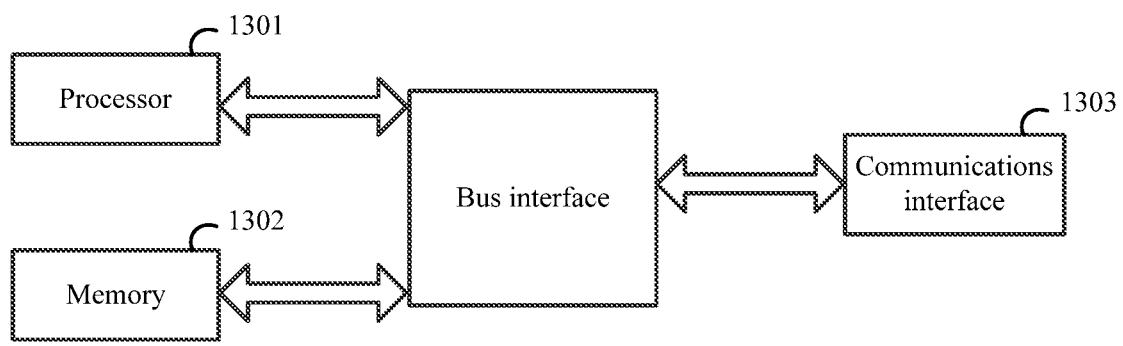
FIG. 13 is a schematic structural diagram of another registration service node device according to an embodiment of the present invention.

Based on a same inventive concept, an embodiment of the present invention provides a registration service node device. For specific implementation of the registration service node device, reference may be made to descriptions of a registration service node in the foregoing method embodiments, same details are not repeatedly described herein. As shown in FIG. 13, the registration service node device mainly includes a processor 1301, a memory 1302, and a communications interface 1303. The memory 1302 stores a preset program, the processor 1301 reads the program stored in the memory 1302, and executes the following procedure according to the program:

obtaining, by using the communications interface 1303, network partition information, and receiving a query request of a service using node, where the query request carries an identifier of a requested service;

determining a service providing node that provides a service indicated by the identifier of the service and a distributed characteristic of the service providing node, where the distributed characteristic is a CP characteristic that meets both consistency C and partition tolerance P, or is an AP characteristic that meets both availability A and partition tolerance P; and determining, according to the network partition information and the distributed characteristic of the service providing node, whether use of a service provided by the service providing node is allowed.

In specific implementation, when determining, according to the network partition information, that a registration service node cluster to which the registration service node belongs has a network partition, the processor 1301 determines that the use of the service provided by the service providing node is prohibited if determining that the distributed characteristic of the service providing node is the CP characteristic; and determines that the use of the service provided by the service providing node is allowed if determining that the distributed characteristic of the service providing node is the AP characteristic.

The network partition information is generated when the processor detects that communication between the processor and another registration service node in the registration service node cluster to which the processor belongs is interrupted; or the processor receives, by using the communications interface, the network partition information sent by another registration service node in the registration service node cluster to which the processor belongs, and the network partition information is generated when the another registration service node detects that communication between the another registration service node and a connected registration service node is interrupted.

In another specific implementation, according to the network partition information and the distributed characteristic of the service providing node, the processor 1301 determines that the use of the service provided by the service providing node is prohibited if determining that the distributed characteristic of the service providing node is the CP characteristic and a service providing node cluster to which the service providing node belongs has a network partition; and determines that the use of the service provided by the service providing node is allowed if determining that the distributed characteristic of the service providing node is the AP characteristic.

The processor 1301 receives, by using the communications interface 1303, the network partition information reported by the service providing node. The network partition information is reported by the service providing node when the service providing node determines that communication between service providing nodes in the service providing node cluster to which the service providing node belongs is interrupted.

Based on the foregoing technical solutions, in the embodiments of the present invention, when registering a service provided by a service providing node, a registration service node obtains a distributed characteristic of the service providing node and network partition information, and determines, according to the network partition information and the distributed characteristic of the service providing node, whether registration of the service provided by the service providing node is allowed, or whether use of the service provided by the service providing node is allowed, so that the registration service node can distinguish an AP-type service providing node from a CP-type service providing node, and can separately process service providing nodes with different distributed characteristics when there is a network partition. This resolves a problem that because distributed characteristics of service providing nodes are not differentiated in a network partition scenario, a service of the AP-type service providing node cannot be registered and a risk is generated when the CP-type service providing node provides a service, thereby reducing risks generated when the registration service node registers and provides a service, and improving network system performance.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, CD-ROM, an optical memory, and the like) that include computer-usable program code.

The present invention is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the present invention without departing from the scope of the present invention. The present invention is intended to cover these modifications and variations provided that they fall within the scope of protection defined by the following claims and their equivalent technologies.

The invention claimed is:

1. A service registration method, comprising:
obtaining, by a registration service node, network partition information, and receiving a registration request of a service providing node, wherein the registration request carries a distributed characteristic of the service providing node, and the distributed characteristic meets both consistency and partition tolerance, or meets both availability and the partition tolerance; and determining, by the registration service node according to the network partition information and the distributed characteristic of the service providing node, whether registration of a service provided by the service providing node is allowed;

wherein the consistency indicates that all nodes have same data at same time, the availability indicates that a response to each request is ensured regardless of success or failure, the partition tolerance indicates that separated systems function properly when there is a network partition.

2. The method according to claim 1, wherein the determining, by the registration service node according to the network partition information and the distributed characteristic of the service providing node, whether registration of a service provided by the service providing node is allowed comprises:

when the registration service node determines, according to the network partition information, that a registration service node cluster to which the registration service node belongs has the network partition, determining that the registration of the service provided by the service providing node is prohibited if determining that the distributed characteristic of the service providing node meets both consistency and partition tolerance; and determining that the registration of the service provided by the service providing node is allowed if determining that the distributed characteristic of the service providing node meets both availability and partition tolerance.

3. The method according to claim 1, wherein the determining, by the registration service node according to the network partition information and the distributed characteristic of the service providing node, whether registration of a service provided by the service providing node is allowed comprises:

according to the network partition information and the distributed characteristic of the service providing node, determining, by the registration service node, that the registration of the service provided by the service providing node is prohibited if determining that the distributed characteristic of the service providing node meets both consistency and partition tolerance and a service providing node cluster to which the service providing node belongs has the network partition; and determining that the registration of the service provided by the service providing node is allowed if determining that the distributed characteristic of the service providing node meets both availability and partition tolerance.

4. The method according to claim 3, wherein the obtaining, by a registration service node, network partition information comprises:

receiving, by the registration service node, the network partition information reported by the service providing node, wherein the network partition information is reported by the service providing node when the service providing node determines that communication between service providing nodes in the service providing node cluster to which the service providing node belongs is interrupted.

5. A registration service node device, comprising:
a memory, a program stored in the memory, and a processor;
wherein the processor is configured to read the program and execute the program to perform:

obtaining network partition information, and receiving a registration request of a service providing node, wherein the registration request carries a distributed characteristic of the service providing node, and the distributed characteristic meets both consistency and partition tolerance, or meets both availability and the partition tolerance; and determining, according to the network partition information and the distributed characteristic of the service providing node, whether registration of a service provided by the service providing node is allowed;

wherein the consistency indicates that all nodes have same data at same time, the availability indicates that a response to each request is ensured regardless of success or failure, the partition tolerance indicates that separated systems function properly when there is a network partition.

6. The device according to claim 5, wherein the processor is configured to further perform:

when determining, according to the network partition information, that a registration service node cluster to which the registration service node belongs has the network partition, determining that the registration of the service provided by the service providing node is prohibited if determining that the distributed characteristic of the service providing node meets both consistency and partition tolerance; and determining that the registration of the service provided by the service providing node is allowed if determining that the distributed characteristic of the service providing node meets both availability and partition tolerance.

7. The device according to claim 5, wherein the processor is configured to further perform:

according to the network partition information and the distributed characteristic of the service providing node, determining that the registration of the service provided by the service providing node is prohibited if determining that the distributed characteristic of the service providing node meets both consistency and partition tolerance and a service providing node cluster to which the service providing node belongs has the network partition; and determining that the registration of the service provided by the service providing node is allowed if determining that the distributed characteristic of the service providing node meets both availability and partition tolerance.

8. The device according to claim 7, wherein the processor is configured to further perform:

receiving the network partition information reported by the service providing node, where the network partition information is reported by the service providing node when the service providing node determines that communication between service providing nodes in the service providing node cluster to which the service providing node belongs is interrupted.

9. A registration service node device, comprising:
a memory, a program stored in the memory, and a processor;
wherein the processor is configured to read the program and execute the program to perform:

obtaining network partition information, and receiving a query request of a service using node, wherein the query request carries an identifier of a requested service;

determining a service providing node that provides a service indicated by the identifier of the service and a distributed characteristic of the service providing node, wherein the distributed characteristic meets both consistency and partition tolerance, or meets both availability and the partition tolerance; and determining, according to the network partition information and the distributed characteristic of the service providing node, whether use of the service provided by the service providing node is allowed;

wherein the consistency indicates that all nodes have same data at same time, the availability indicates that a response to each request is ensured regardless of success or failure, the partition tolerance indicates that separated systems function properly when there is a network partition.

10. The device according to claim 9, wherein the processor is configured to further perform:

when determining, according to the network partition information, that a registration service node cluster to which the registration service node belongs has the network partition, determining that the use of the service provided by the service providing node is prohibited if determining that the distributed characteristic of the service providing node meets both consistency and partition tolerance; and determining that the use of the service provided by the service providing node is allowed if determining that the distributed characteristic of the service providing node meets both availability and partition tolerance.

11. The device according to claim 9, wherein the processor is configured to further perform:

according to the network partition information and the distributed characteristic of the service providing node, determining that the use of the service provided by the service providing node is prohibited if determining that the distributed characteristic of the service providing node meets both consistency and partition tolerance and a service providing node cluster to which the service providing node belongs has the network partition; and determining that the use of the service provided by the service providing node is allowed if determining that the distributed characteristic of the service providing node meets both availability and partition tolerance.

12. The device according to claim 11, wherein the processor is configured to further perform:

receiving the network partition information reported by the service providing node, wherein the network partition information is reported by the service providing node when the service providing node determines that communication between service providing nodes in the service providing node cluster to which the service providing node belongs is interrupted.

* * * * *